Oct. 1, 1963  E. WILDHABER  3,105,332
METHOD OF PRODUCING HOURGLASS WORMS AND HOURGLASS HOBS
Filed April 18, 1960  6 Sheets-Sheet 1
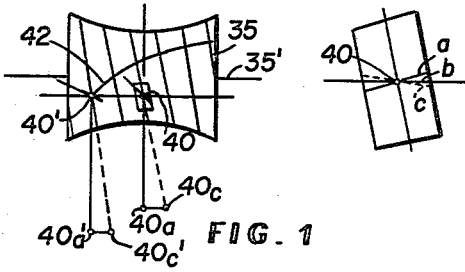
FIG. 1  FIG. 4
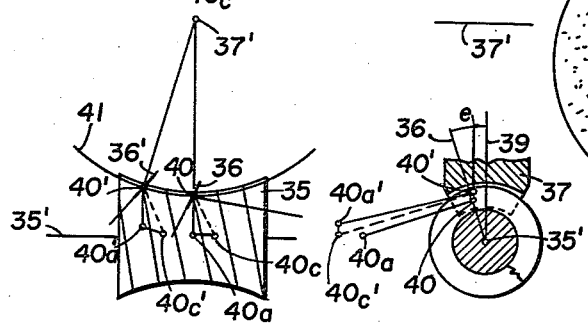 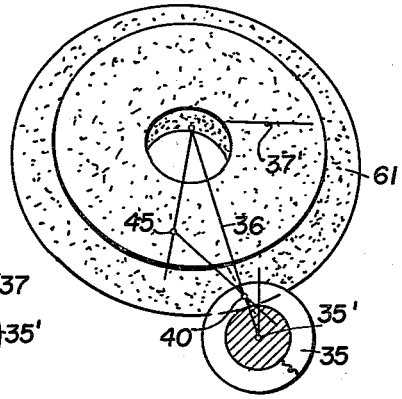
FIG. 2  FIG. 3  FIG. 5
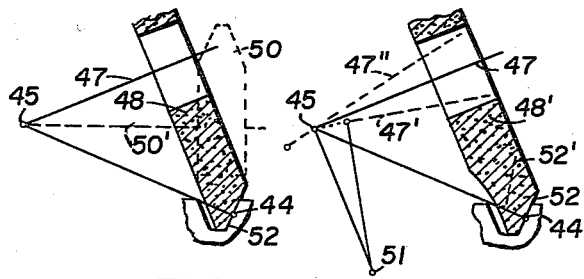 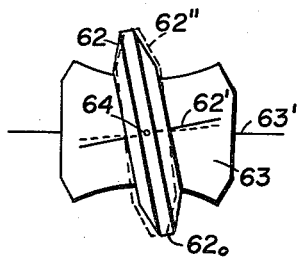
FIG. 6  FIG. 7  FIG. 10
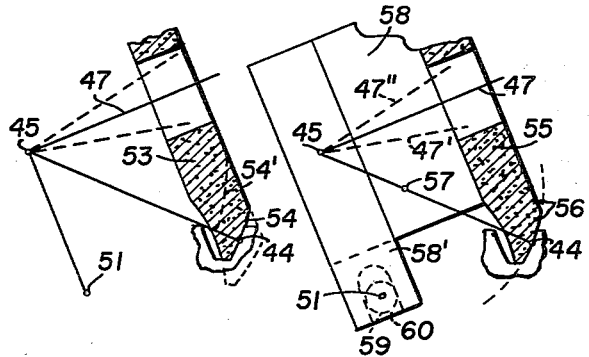
FIG. 8  FIG. 9
INVENTOR:
Ernest Wildhaber

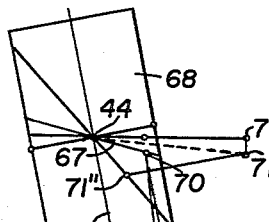
FIG.11
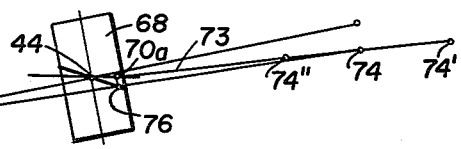
FIG.13
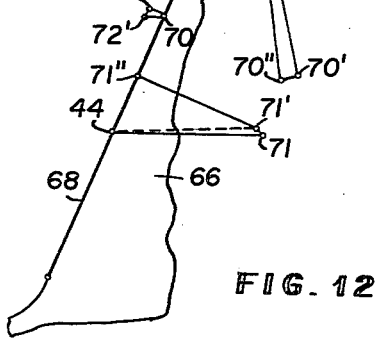
FIG.12
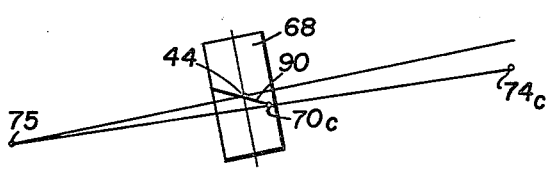
FIG.14
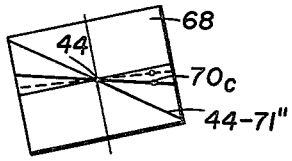
FIG.15
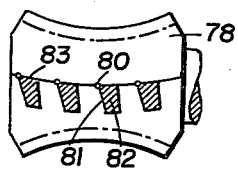
FIG.17
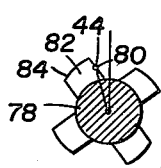
FIG.18
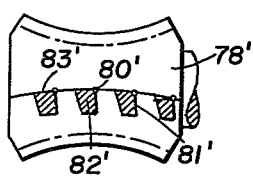
FIG.19
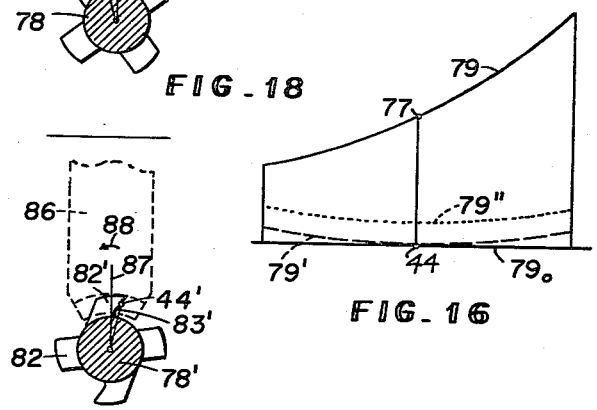
FIG.20
FIG.16

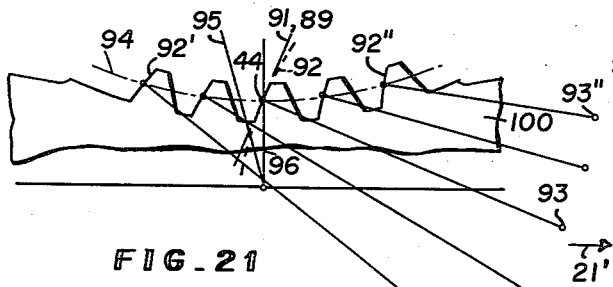
FIG_21
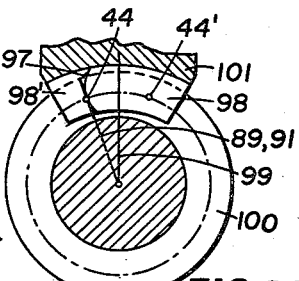
FIG_22
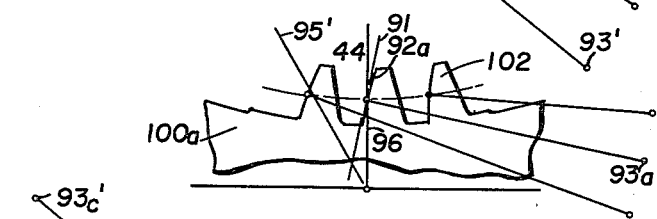
FIG_23
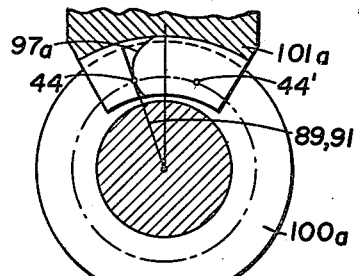
FIG_24
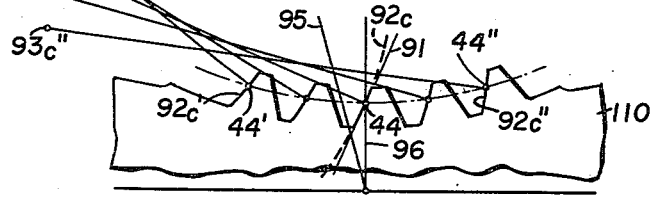
FIG_25
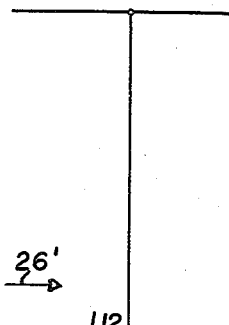
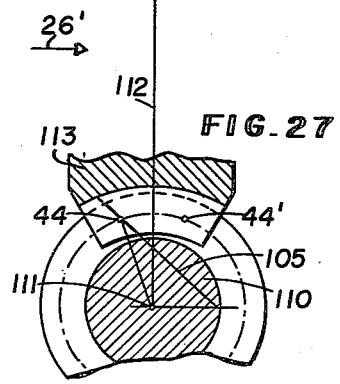
FIG_26
FIG_27
INVENTOR:
Ernest Wildhaber

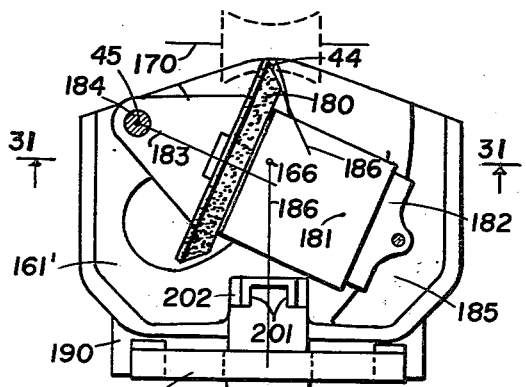
FIG_30
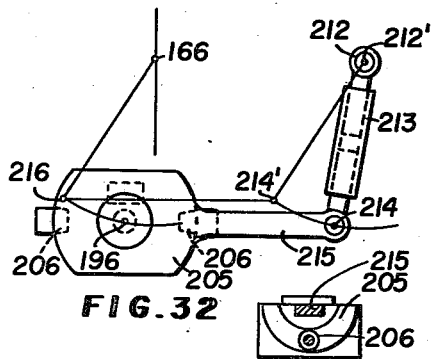
FIG_32
FIG_34
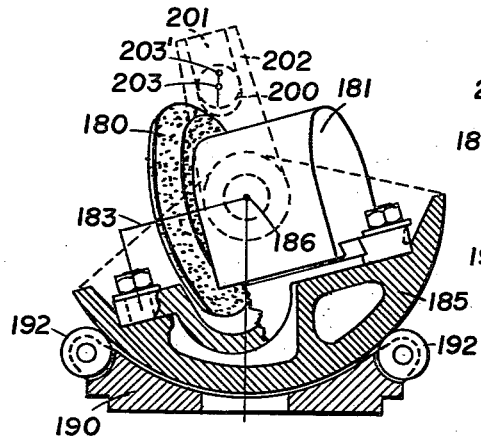
FIG_31
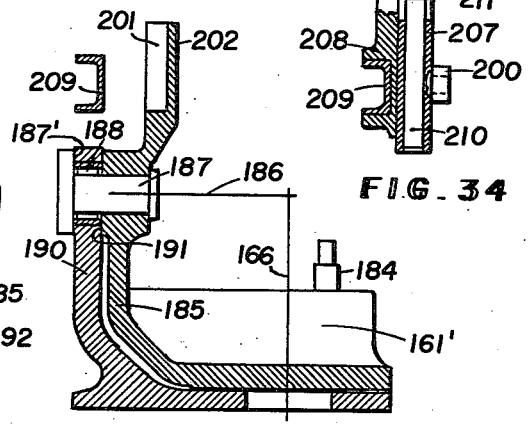
FIG_33

Oct. 1, 1963    E. WILDHABER    3,105,332
METHOD OF PRODUCING HOURGLASS WORMS AND HOURGLASS HOBS
Filed April 18, 1960    6 Sheets-Sheet 6
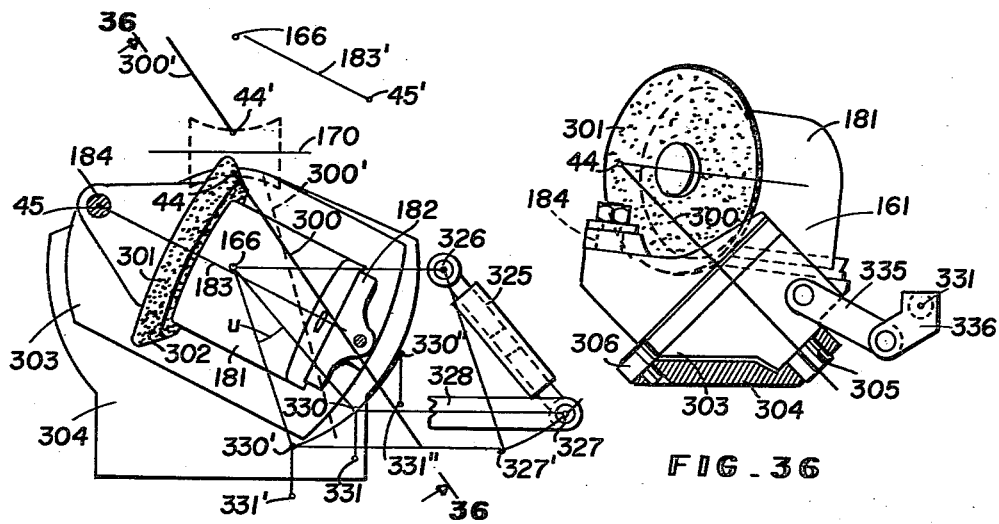
FIG_35
FIG_36
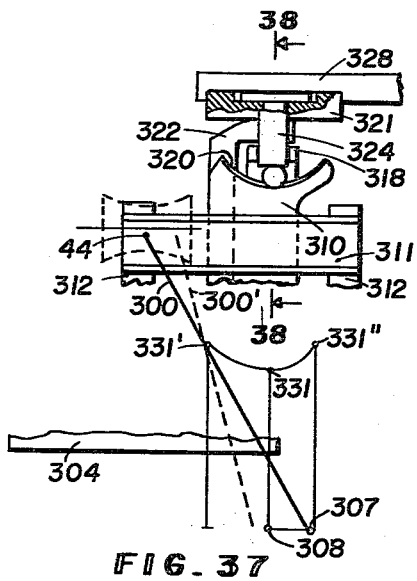
FIG_37
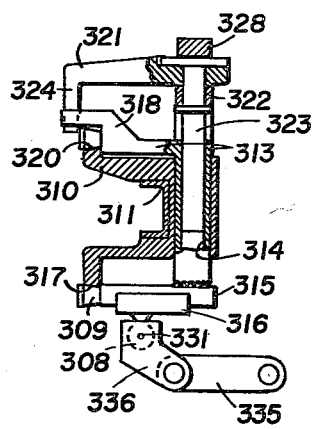
FIG_38
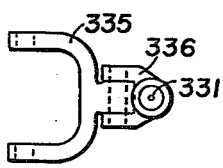
FIG_39
INVENTOR:
Ernest Wildhaber

United States Patent Office 3,105,332
Patented Oct. 1, 1963

3,105,332
METHOD OF PRODUCING HOURGLASS WORMS AND HOURGLASS HOBS
Ernest Wildhaber, Brighton, N.Y.
(124 Summit Drive, Rochester 20, N.Y.)
Filed Apr. 18, 1960, Ser. No. 22,930
13 Claims. (Cl. 51—287)

The present invention relates to the production of hourglass worms in double-enveloping worm gearing with rotary tools, particularly with grinding wheels, and to the tooth shape produced thereby.

Such hourglass worms have hitherto lacked means for accurate production after hardening, although grinding methods have been used on large reduction ratios requiring small lead angles, the success of such methods decreasing with increasing lead angle. On the whole such worms were left unground and unhardened beyond a degree which still permitted cutting. In spite of this handicap, as compared with conventional worm gearing using cylindrical worms, such double-enveloping wormgear drives have stood up very well in practice, because of the intimate tooth contact obtainable therewith.

One object of the present invention is to eliminate this handicap by providing an accurate method of finishing hourglass worms after hardening, especially a grinding method, and a method that can be used at all lead angles, large and small.

Another aim is to apply the method also to the use of rotary tools other than grinding wheels, such as milling cutters and rollers.

A further object is to provide a method of producing the hourglass worms described in my application Serial No. 682,804, now Patent No. 2,935,886 granted May 10, 1960.

In carrying out this method on hourglass worms some changes in thread shape occur. A further aim is to compensate such changes in the production of the mating wormgear, so that conjugacy is accurately retained.

Other objects will appear in the course of the specification and in the recital of the appended claims.

In the drawings:

FIGURES 1 to 4 are diagrams explanatory of the principles underlying the present invention. FIGS. 1 and 2 show the pitch surface of an hourglass worm of the type disclosed in my aforesaid patent, in views taken along the line of centers of the wormgear pair and in the direction of the wormgear axis respectively. FIG. 3 is a mid-section of the worm taken at right angles to its axis, with the wormgear shown fragmentarily, the sectional plane containing the wormgear axis. FIGS. 1 to 3 further show a geometrical construction of the direction of relative motion between a generating line and the worm. FIG. 4 is an enlarged view of the thread-side tangent plane shown in FIG. 1, looking radially along the normal of the pitch surface.

FIG. 5 is a mid-section of the worm like FIG. 3, showing a grinding wheel or rotary tool in engagement with a thread side of the worm.

FIG. 6 is a fragmentary axial section of an inclined grinding wheel preferably used.

FIG. 7 is a section similar to FIG. 6, showing also a preferred way of advancing the grinding wheel for dressing or truing, so that the wheel produces the same profile curvature at all stages of its life.

FIG. 8 is a grinding-wheel section similar to FIG. 7, but showing a wheel with a spherical grinding surface, to maintain not only the profile curvature but the entire produced thread shape exactly the same during the life of the wheel.

FIG. 9 is a similar axial section of a grinding wheel with differently curved convex profile.

FIG. 10 is a daigrammatic view showing the use of rollers for producing hourglass worms.

FIG. 11 is a view like FIG. 4 of the tangent plane, at a larger scale, showing together with FIG. 12 a geometric construction of the change in lead angle occurring at different tooth depths.

FIG. 12 is a view taken lengthwise of the tangent plane, corresponding to FIG. 11.

FIGS. 13 and 14 are diagrams for determining the direction of the line of contact between a grinding wheel and a thread side of the worm.

FIG. 15 is a direct view of the tangent plane also shown in FIGS. 11 to 14, looking along the surface normal.

FIG. 16 is a diagram illustrating profile curvature along the length of a worm thread, as produced with two modifications of the invention.

FIG. 17 and FIG. 18 are a diagrammatic side view and a mid-section through its throat of a hob for cutting one side of the wormgear teeth, some hob teeth being shown in a section along the pitch surface in FIG. 17.

FIGS. 19 and 20 are a similar diagrammatic side view and a mid-section of a hob for cutting both sides of the wormgear teeth. FIG. 20 shows also fragmentarily the wormgear being cut.

FIG. 21 is a side view taken in direction 21' of FIG. 22 of a worm section extending along a surface of revolution that contains the generating line of the worm thread and that is coaxial with the wormgear of that worm. Sectional cross-hatching is omitted in FIGURES 21, 23, 25 and 26 because of the many explanatory lines and because of the unusual viewing direction.

FIG. 22 is a mid-section of the worm corresponding to FIG. 21, showing also the wormgear fragmentarily.

FIGS. 23 and 24 are similar to FIGURES 21 and 22, but refer to a worm of high lead angle, and showing tooth proportions adapted to such a worm.

FIG. 25 is a view similar to FIG. 21, but referring to a worm produced with a grinding wheel or rotary tool of convex profile.

FIG. 26 is a side view taken in direction 26' of FIG. 27 of a worm section extending along a surface of revolution described by the pivotal axis as it moves about the wormgear axis.

FIG. 27 is a mid-section of the worm shown in FIG. 26, showing also the wormgear fragmentarily. FIGS. 26 and 27 illustrate the thread shape produced with a grinding wheel of convex profile and a pivot axis offset from the worm axis.

Figure 28:
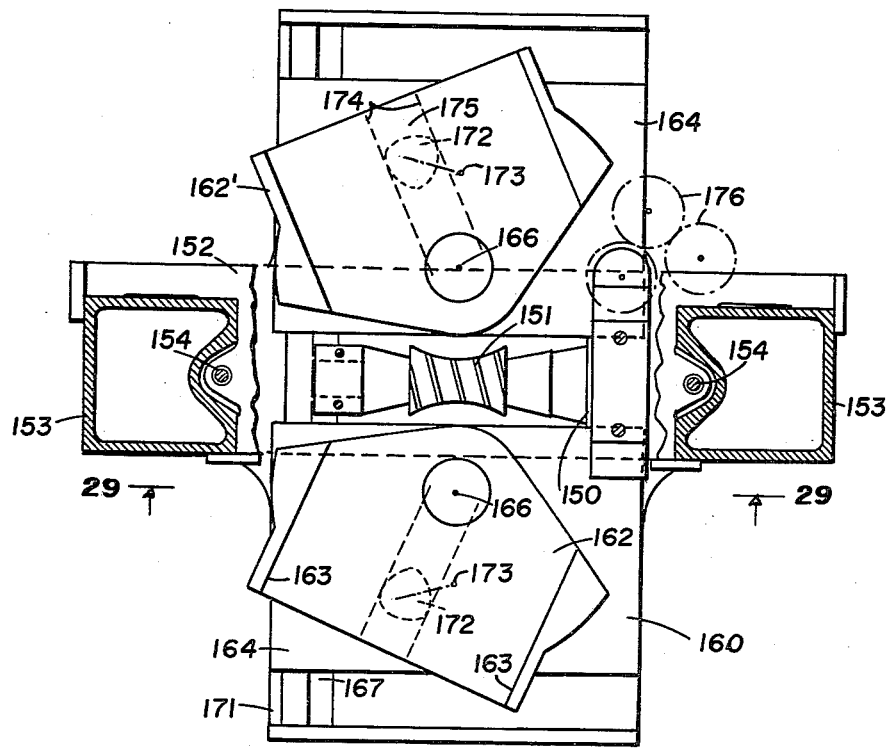
Figure 29:
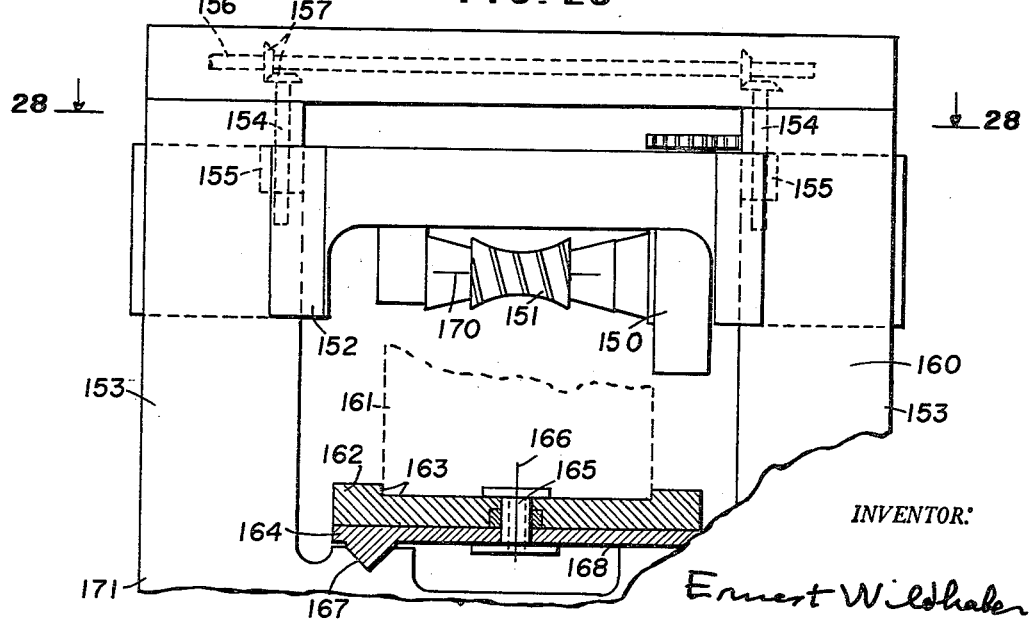

FIGS. 28 and 29 illustrate the general disposition of a machine for carrying out my method. FIG. 28 is a plan view and a section along lines 28—28 of FIG. 29, looking in the direction of the arrows. FIG. 29 is a front elevation and a section along lines 29—29 of FIG. 28.

FIGS. 30 to 34 illustrate one form of interchangeable unit used on the machine of FIGS. 28 and 29.

FIG. 30 is a plan view of this unit, with the grinding wheel set to zero lead angle, one part being removed.

FIG. 31 is a front elevation and a section along lines 31—31 of FIG. 30, showing the grinding wheel in a position to grind a right hand worm.

FIG. 32 is a diagrammatic view taken in the same direction as FIG. 30 and explaining the operation of the pivotal motion.

FIG. 33 is a vertical section laid through the pivotal axis 186 and corresponding to FIGS. 30 and 31.

FIG. 34 is a section laid through the axis 196 (FIG. 32) parallel to the sectional plane of FIG. 33.

FIGS. 35 to 39 illustrate another form of interchangeable unit used on the machine of FIGS. 28 and 29.

FIG. 35 is a simplified plan view and a diagram explanatory of the function of the unit.

FIG. 36 is a vertical section taken along lines 36—36 of FIG. 35 and a view taken in the direction of the arrows.

FIG. 37 is a fragmentary front elevational view corresponding to FIG. 35, partly in section, and a diagram explanatory of the function of the unit.

FIG. 38 is a sectional view taken along lines 38—38 of FIG. 37, looking in the direction of the arrows.

FIG. 39 is a plan view of the linkage shown in FIGS. 36 and 38.

FIGURES 1 to 3 diagrammatically show a double-enveloping worm gearing. It is of the specific type disclosed in my aforesaid patent. In principle a thread side of the worm 35 may be described by a generating line 36 that moves with the wormgear 37 about the wormgear axis 37′, while the worm turns on its axis as if meshing with the wormgear. A mean point 40 of the generating line 36 then describes a circle 41, which is here offset from the mid-plane of the wormgear with worm axis 35′. In other known forms of double-enveloping worm gearing this circle (41) lies in the mid-plane. They can be considered a special case of the illustrated gearing, the case where said offset is zero.

The generating line 36 is a line which the worm and wormgear have in common. One might say that they contact along the generating lines. On the previously known types of double-enveloping worm gearings this line has been considered the line of contact, and the surface described by the generating line in its rotation about the wormgear axis has been called the surface of action. However it can be readily demonstrated that the contact along such a generating line cannot be tangential contact, because the worm diameter changes lengthwise of the worm and the lead angle changes with it. In principle it is edge contact. Such contact is incapable of carrying the loads actually transmitted. The generating line is actually the intersection line of the thread sides of the worm and the tooth sides or extended tooth sides of the wormgear. It might be called the interference line. This line is here fixed on the wormgear teeth.

The load carrying tangential contact exists along a surface of action that extends diagonally through the region of intermesh. Its intersection with the pitch surface of the worm, the path of contact, is indicated at 42 in FIG. 1. Its determination is described at length in my aforesaid patent. The inclination of path 42 to the direction of the worm axis increases with decreasing tooth ratio of the wormgear and worm.

The lead angle of the worm is understood to be the inclination of the longitudinal thread direction to the peripheral direction. It changes also depthwise of the threads, and is smaller at the outside of the threads than at their bottom. Because of this twist of the thread side a grinding wheel does not contact it in an axial plane of the wheel (line $a$, FIG. 4), nor in an axial plane of the worm (line $b$), but along a line ($c$) that extends obliquely thereto. This causes the thread profile produced by a given grinding wheel to depend not only on the grinding-wheel profile, but on the radius of the grinding wheel as well. Particularly it depends on the normal radius of the grinding wheel, on distance 44—45 in FIG. 6. It lies on the surface normal at mean point 44. Point 45 is the intersection of the surface normal with the axis 47 of the grinding wheel 48. Wheels of equal axial profile and equal normal radius (44—45) produce thread profiles of the same curvature at the mean point (44) of a given worm. The thread profiles in general differ from the wheel profiles. They differ increasingly with increasing normal wheel radius.

Wheel 48 contacts only one side of the engaged thread space and lies tilted therein. It has unequal profile inclinations on opposite sides to the direction radial of its axis. For comparison an equivalent grinding wheel with equal profile inclinations on opposite sides is shown in dotted lines 50. Its axis 50′ passes through said point 45. The tilted wheel 48 with the same curvature effect is seen to be much larger. This confines wheel wear and thereby achieves a gain in accuracy.

A further improvement is achieved by keeping the normal radius 44—45 constant during the life of the wheel. This is done by advancing the wheel 48′ (FIG. 7) for dressing by moving it about point 45 and also displacing it axially, so that the wheel support turns instantaneously about a center 51 while the grinding wheel profile to be dressed remains at 52. Dotted lines 52′ indicate a profile that will advance to 52 at a later stage of the wheel life.

47′, 47″ are different positions of the axis of the grinding wheel during its life.

In a further refinement a wheel 53 (FIG. 8) with spherical grinding surface 54 centered at 45 may be used in place of the conical wheel 48′. It is adjusted for dressing as described for wheel 48′. The entire grinding surface then remains exactly the same during the entire wheel life.

For other purposes to be discussed I may use a wheel 55 (FIG. 9) with convex grinding surface 56, whose profile has a curvature center 57 at mean point 44. Its profile curvature is larger than that of the spherical wheel 53. It is advanced for dressing like the wheels 48′, 53. FIG. 9 also shows structure to move the wheel axially when the angular position of its axis 47 is changed. The wheel 55 is rotatably mounted on a slide 58 that is movable in the direction of the wheel axis 47. Rigidly secured to slide 58 is an arm 58′ with a straight slot 60. The slot extends in the direction of line 45—51 shown also in FIGS. 7 and 8, and engages a pin or roller 59 whose fixed axis passes through said point 51. When the wheel axis and wheel support are tilted about pivot 45, the wheel slide 58 is displaced in the desired way.

FIG. 5 shows the hourglass worm 35 in engagement with a grinding wheel or rotary tool 61, that may be any one of the described wheels 48′, 53, 55. The wheel 61 and worm 35 are moved relatively to each other, in principle, as if the wheel would move with the wormgear about the wormgear axis 37′, while the worm turns on its own axis as if meshing with the wormgear. The wheel 61 thereby sweeps the length of a thread side from one end to the other. In accordance with the invention the wheel is also tilted about an axis passing adjacent the engaged thread side, to keep the wheel aligned with the lengthwise direction of said thread side. This axis intersects the surface normal (44—45) at the mean point (44) of grinding contact, and preferably lies in the tangent plane at mean point 44. It coincides with the tangent to the generating line, and with the generating line itself if the latter is straight.

Salient features of the preferred form of my method will now be enumerated.

First, the profile inclination of the grinding surface to the radial direction and to the plane of rotation of the grinding wheel is made larger than the profile inclination of the hourglass worm to the normals of its pitch surface. The said plane is at an angle to the depthwise direction of the engaged thread space, and the wheel engages only one side of this space.

Second, the wheel advance for dressing comprises a tilt about a point (45) of its axis and an axial displacement of the grinding wheel, to keep the normal wheel radius constant at all stages of the wheel life.

Third, a wheel of convex profile is preferably used. A spherical wheel produces exactly the same thread shape at all stages of its life.

Fourth, the grinding wheel is tilted about a pivot axis as it relatively moves along a thread side, at a varying rate, to keep the grinding surface aligned with the lengthwise direction of the engaged thread side. The pivot axis preferably passes through the mean point of grinding engagement.

Fifth, the pivot axis is preferably inclined to the depthwise direction of the tooth space engaged by the grinding wheel or rotary tool.

Sixth, the pivot axis preferably lies in the tangent plane at a mean point of grinding engagement. It is tangent to the grinding surface and coincides with the tangent of the generating line.

Seventh, in an important embodiment the pivot axis, and with it the direction of the generating line, is so chosen that in the mean position the line of grinding contact extends in the direction of the pivot axis, as will be further described.

Eighth, in the above and other important embodiments the pivot axis is offset from the worm axis, and offset to the same side as the thread surface normal, at the mean point of grinding engagement.

While I have generally used the term of grinding, it should be understood that this term should be interpreted in its broad sense, that the method applies to abrading in general, and also to milling, with a milling cutter taking the place of a grinding wheel. Also it applies to forming by rolling.

FIG. 10 diagrammatically shows a roller 62 with axis 62' in engagement with an hourglass worm 53 with axis 63'. Preferably two or more rollers are spaced about the axis 63' of the worm, at least one per thread space on multiple-thread worms. Each roller is moved lengthwise of the thread surfaces about an axis positioned approximately like the axis of the mating wormgear, while the worm turns on its axis as if meshing with the wormgear. Each roller is fed depthwise as it so moves and rolls. And in each pass the roller is tilted at a varying rate about a pivot axis 64, to adjust it to the varying lead angle of the thread sides.

The provision for tilting is also made use of during the depth feed. The lead angle is smaller at the outside than further in. Sliding is minimized by adapting the tilt position of the roller to the lead angle near the portion engaged by the outside surface $62_0$ of the roller 62. This results in pure rolling in the region of largest stress and thereby avoids or reduces surface cracks. At the start of the rolling operation, when the roller 62 acts near the outside surface of the worm 63, the roller is in the dotted position 62" at the middle of its roll, tilted about pivot axis 64 as compared with position 62.

A change of tilt angle about the pivot axis during the depth feed can also be profitably applied when rolling cylindrical worms having helical threads, helical splines, helical gears, etc. The tilt change is here made for the depth feed only, none being required for the feed lengthwise of the helical tooth sides.

Grinding Contact

The contact between a thread side of the worm and a grinding wheel or rotary tool will now be further described.

FIG. 11 is a view of the thread tangent plane at a mean point of grinding contact, looking radially towards the worm axis at the throat of the worm. It can be considered an enlargement of FIG. 4. FIG. 12 is a corresponding view looking lengthwise of the tangent plane along the pitch-line tangent 65. For identification a fragmentary thread portion 66 is shown. However what we actually consider is a very small (infinitesimal) portion adjacent mean point 44, using a very great enlargement, in the manner of calculus.

Line 67 is any line in the tangent plane 68 passing through mean point 44 and assumed as the pivot axis. At any point 70 thereof the lead angle of the thread side is different from that at mean point 44. It will now be shown how the lead angle has changed. We consider the relative motion at point 70 between the worm and its generating line. The relative instantaneous displacement is made up of the displacement 70—70' at mean point 44 and of an additional displacement 70'—70". This additional displacement is as if the instantaneous axis of relative motion were to pass through point 44.

The direction of the instantaneous axis and the turning velocity about it can be obtained by vectorial addition of the angular velocities about the worm axis and the wormgear axis. A distance 44—71 proportional to the angular velocity about the worm axis is plotted on a line parallel to the worm axis. And a distance 71—71' is plotted on a line parallel to the wormgear axis to define the angular velocity about this axis. Distance 71—71' is shown in projection, as the drawing plane of FIG. 11 is inclined to the wormgear axis. The dotted line 44—71' defines the direction of the instantaneous axis, and the full length of distance 44—71', the length of the vector, is a measure of the angular velocity about the instantaneous axis.

The said additional displacement contains a component 70—72 (FIG. 12) perpendicular to the tangent plane and a component in the tangent plane. The latter component is negligible as compared with finite distance 70—70', in accordance with the procedures of calculus. The displacement component 70—72 (FIG. 12) perpendicular to the tangent plane is caused entirely by the vector component 44—71" in the tangent plane. It is proportional to vector component 44—71" and to the actual distance of point 70 from line 44—71". Thus distance 70—72 (FIG. 12) can be determined with the known procedures of mathematics.

In FIG. 11 we need the distance 70—72' of FIG. 12, whose projection is the normal distance 70—72. 70'—70" of FIG. 11 is made equal to 70—72'. 70'—70—70" is the change in lead angle at point 70 as compared with the lead angle at point 44, and the change in direction of the projected normals.

FIG. 13 is a view in the same direction perpendicular to the pitch surface as is FIG. 11, but at a smaller scale. In the embodiment here illustrated the pivot axis 44—70a lies in the worm axial plane that also contains point 44. Point 70a is a point of this pivot axis, and 73 is the thread-surface normal at said point, determined as described. It contains the curvature center 74 of the thread side, in a section parallel to the tangent plane of the pitch surface. 75 is the intersection of the surface normal at 44 with the axis of the grinding wheel. The wheel axis lies in normal plane 44—75. Its inclination to the drawing plane is immaterial as regards curvature.

Contact between the wheel surface and thread side cannot exist at point 70a, because the normals 73 and 70a—75 are inclined to each other. At the level of point 70a above the drawing plane contact is at a point 76 that lies on the connecting line 74—75 of the curvature centers. Line 44—76 defines the direction of the line of contact between the grinding wheel and the thread side. Here the profiles of the wheel and of the thread side are matched and complementary. In all other directions the profile curvatures differ from one another. Thus, if the wheel profile is kept straight in the direction 44—70a of the pivot axis, the resultant thread profile is convex in a section laid in this same direction. It departs from a straight line increasingly with increasing inclination of line 44—70a to the contact line 44—76.

At point 70a the thread side and the wheel surface have a separation $z$, to be measured in a plane parallel to the drawing plane of FIG. 13, that is parallel to the tangent plane at point 44 of the pitch surface. Distance $z$ is like the separation at 70a of two circles (not shown) centered at 74 and 75 respectively and contacting at point 76. When $x$ denotes the distance 70a—76, and $r'$, $r''$ denote the curvature radii 75—76 and 74—76 respectively, distance $z$ amounts to $$z = \tfrac{1}{2}x^2\left(\frac{1}{r'} + \frac{1}{r''}\right)$$

as can be demonstrated. While this formula is based on infinitesimal distances in the manner of calculus, it applies approximately also to the finite distances within the tooth boundaries.

We have considered above a mean point 44 at the throat of the worm. Conditions change along the worm thread together with the inclination of the thread profile to planes of rotation of the worm, that is to planes perpendicular to the worm axis. Curvature radius $r''$ increases with decreasing inclination, as can be established either by computation or by actually intersecting a worm thread. This change of $r''$ is a principal factor of the change of profile curvature along the worm thread. 74' denotes a curvature center at decreased profile inclination, while 74'' shows its position at increased profile inclination to planes of rotation. It can be demonstrated that the separation $z$ increases with decreasing profile inclination.

FIG. 16 shows the separation $z$ lengthwise of a thread side graphically. Ordinate 44—77 of curve 79 represents $z$ at point 44, at the throat of the worm, at a suitably enlarged scale. $z$ increases towards the right end of the worm and of the graph and decreases towards the left end.

The ordinates of curve 79 also represent the curvature of the thread profile, the reciprocal of the curvature radius, in a normal section taken along the pivot axis, when the wheel profile is straight in said section. More broadly the said ordinates can be considered the relative curvature between the grinding surface and the thread side in said section, the difference of their curvatures.

This changing curvature constitutes a departure from the basic tooth shape, the shape obtained on the worm by turning a given line about the wormgear axis while the worm turns on its own axis as if meshing with the wormgear. In accordance with the invention the sting is taken out of this departure by making the hob like the worm, so that it has the same changing profile curvature. In this way exact conjugacy is retained. Also retained all along the thread sides is the direction of the generating line at mid-height, as at point 44, and the pitch line. In other words the basic tangent planes at all points of the pitch line are preserved. Immediately adjacent the pitch line the gearing meshes and acts precisely like the basic worm gearing started out from.

Wormgear Production

FIGS. 17 and 18 show a hob 78 for finishing one side of the wormgear teeth at a time with cutting edges 80. These are the intersections of the side surfaces 81 of the cutting teeth 82 with cutting face 83. The cutting edges preferably lie in a surface of revolution identical with the surface obtained by rotating the generating line of the basic thread about the wormgear axis.

This is here approximately a conical surface. It is an axial plane in the Cone or Hindley worm gearing. The finishing hobs are not intended to cut materially with their outside edges and have little or no relief at the outer ends 84 of the cutting teeth 82. The side surfaces are relieved by having more lead and more lead angle than the worm on one side (81) and less lead and lead angle on the opposite side (81'). Hobs of this type do not require many cutting edges on the circumference because of the intimate contact between the worm and wormgear. Hob 78 is shown with only four gashes. In any case the number of gashes are small enough that a large grinding wheel can be used for relieving, without danger of interfering with the following cutting teeth. In accordance with the invention the grinding wheels used on opposite sides of the hob thread average the grinding wheel used on the worm itself. A grinding wheel of smaller normal radius than average is used on the side 81 of larger lead angle. And a grinding wheel of larger normal radius is used on the side 81' of smaller lead angle. It can be demonstrated that in this way the changing profile curvatures of the worm can be duplicated on the hob in close approximation.

The two sides of the wormgear teeth may be finished successively with the same hob, for instance by turning the workpiece around, so that first one end and then the other end faces the driving head. Or two hobs may be used on opposite sides of the gear blank to cut both sides simultaneously. In this case the hobs 78, 78' have cutting faces 83, 83' (FIGS. 17, 19) that are counterparts of each other and that contain the mean points 44, 44' (FIGS. 18, 20). Cutting face 83 is concave lengthwise, while cutting face 83' is convex lengthwise. Each of the two finishing hobs has only one kind of cutting faces and finishes with one side of its thread or threads. When embodied as one of a pair of finishing hobs, the hob of FIG. 19 contains only the cutting faces 83', or has its finishing edges disposed in surfaces 83'.

For use as a single hob, the hob 78' of FIGS. 19 and 20 may be provided with cutting teeth 82, 82' for cutting opposite sides of the wormgear teeth. Teeth 82 have cutting faces 83 that are concave lengthwise, while teeth 82' have longitudinally convex cutting faces 83'.

A depthwise feed motion is provided between the hob and the wormgear blank 86 in the direction of their line of centers 87 until full-depth position is reached. The tooth shape is applied in full-depth position. In the conventional depthwise feed some portions of the wormgear teeth are cut off which could otherwise provide tooth contact. To avoid this loss of contact it is customary to use hobs with threads of decreased thickness, and to sidecut in full-depth position, to finish first one side of the wormgear teeth and then the other side. I have found a way to do away with side-cutting and to finish both tooth sides at the same time. This is accomplished by tilting the hob about the line of centers 87 during the infeed, as indicated by arrow 88. In this way the interfering thread portions of the hob can be kept back so as not to interfere.

Modified Worm-Thread Production

FIG. 14 is a view of the thread tangent plane like FIG. 13, looking along the pitch surface normal at point 44. The pivot axis 90 lies here also in said tangent plane, but has a different direction therein. It is offset from the worm axis to the same side as the projected tooth surface normal (40—45, FIG. 5).

In one embodiment the pivot axis 90 extends in the direction of grinding contact in the mean position of the grinding pass. The point 70c, FIG. 14, is determined whose normal 70c—75 passes through the curvature center 75 of a given grinding wheel, proceding as described with FIGS. 11 and 12. The pivot axis is laid along line 44—70c. Normal 70c—75 also contains the curvature center 74c of the worm thread in the considered section parallel to the drawing plane. The grinding wheel and thread side have no relative curvature in sections laid along the pivot axis 90, which is also the generating line of the thread side or the tangent thereto. In other positions lengthwise of the thread side, and at the same distance from the pitch surface, the point of contact has a distance $x$ from point 70c, $x$ being parallel to the drawing plane. $x$ is relatively small. It is positive on the side of decreased profile inclination to planes of rotation. It is negative on the side of increased profile inclination. In the above formula the separation $z$ and with it the relative curvature are proportional to the square of $x$, to $x^2$, which is very small for small amounts of $x$.

The ordinates of the dash line 79' in FIG. 16 show the distribution of relative curvature lengthwise of the thread. Line 79' is tangent to the X-axis $79_0$ at the mid-point 44. A slight amount of ease-off at the profile ends is desired, as can be provided by a slight relative curvature. The dotted line 79'' corresponds in the average to such amount. It could be attained with a slightly different wheel-profile curvature, and by relieving the hob with the conventional small wheels. It can be kept exactly constant along the length of the thread by using the described large wheels in relieving the hob.

In a further embodiment the pivot axis coincides with the normal projection to the tangent plane 68 of a line parallel to the worm axis (line 44—71, FIG. 11). In the axial view, FIG. 5, the pivot axis then appears to coincide with the projected surface normal (40—45). A convex wheel of the type 55 (FIG. 9) is preferably used. Its profile curvature is so determined that the normals at points of the line of grinding contact exert a constant or very nearly constant leverage with respect to the axis 37' about which the grinding-wheel support is moved. In this case a given force acting along any of these normals exerts a constant or very nearly constant turning moment with respect to axis 37'.

In this embodiment the normals of the thread surfaces of the worm have all an approximately constant leverage with respect to the worm axis. Likewise the normals of the tooth surfaces of the wormgear have an approximately constant leverage with respect to the wormgear axis. The leverages exerted on the wormgear and worm are in the ratio of their tooth numbers. Each point of a worm-thread side can contact each point of a mating gear-tooth surface if it gets into tangent relationship thereto, because it fulfills the kinematic condition of gear contact. This makes for improved adjustment characteristics of the wormgear pair.

In some instances the grinding wheel so determined has a spherical grinding surface. In other instances the pivot axis may coincide with the direction of the line of grinding contact in the mean position. The embodiment is then a special case of this previously described embodiment.

*Produced Thread Shape*

FIGS. 21 and 22 illustrate the thread shape or tooth shape produced on a worm 100 when the line of grinding contact in the mid-position is inclined to the pivot axis about which the grinding wheel is tilted during each grinding pass. The pivot axis 89 lies in said tangent plane and coincides with the profile tangent 91. FIG. 21 is an axial view of the tapered surface of revolution described by the pivot axis, as it turns about an axis which approximately coincides with the wormgear axis, looking from left to right in FIG. 22. Sectional cross-hatching is omitted in this oblique view of the surface.

A grinding wheel surface that is straight in the direction of the pivot axis produces somewhat convex profiles on the worm. The produced mean profile 92, shown extended, has a curvature center 93. All along the sectional surface the profiles 92', 92, 92" are equally inclined to the circle 94 described by mean point 44. The profile tangents 91 have a constant distance from the axis of the described surface of revolution.

The showing applies to a right hand worm having a lead angle at the throat represented by the inclination of line 95 (FIG. 21) to the central plane of rotation 96. The curvature of the profiles 92', 92, 92" increases from left to right. 93', 93" are the curvature centers of the profiles 92', 92".

The tooth surfaces of the mating wormgear 101 and the worm-thread sides intersect approximately at the interference or generating line of the basic tooth form. Its fixed position on each wormgear tooth surface coincides with the position of the pivot axis in said surface of revolution. Because of the change in profile curvature the exact intersection line moves somewhat with the turning position on the wormgear tooth surface at points away from mean point 44, while retaining its tangent at point 44. The various intersection-line positions envelop a curve 97 (FIG. 22). The working surface is at 98, to the right of curve 97 on the considered side. The tooth-side portion 98' to the left of curve 97 has no conjugate tooth action. It is relieved to keep out of contact. The relief is commonly applied in the hobbing operation with a hob somewhat longer than the worm.

44' denotes the mean point on the rear side of the wormgear tooth. When the wormgear 101 is turned over about the line of centers 99 to show said rear side, the latter coincides with the first considered tooth side.

The path of contact 42 (FIG. 1) is inclined to the direction of the worm axis increasingly with decreasing tooth ratio of the wormgear and worm. At relatively low ratios that correspond to a large worm lead angle at the throat, as defined by the inclination of line 95' (FIG. 23) to plane 96, the tooth contact moves so fast across the gear face that the tooth action is confined to a smaller length of the worm. Then a smaller inclination of the profiles 92a to the depthwise direction of the worm thread may be used on such a worm 100a, and a deeper thread 102. The worm may also be shortened. The increased depth of the thread then makes up for the loss in length. The showing is otherwise similar to that of FIGS. 21, 22. The working surface of the wormgear 101a is to the right of curve 97a (FIG. 24).

FIG. 25 is a view like FIG. 21 and illustrates the shape obtained when a grinding wheel of convex grinding profile, and a convex spherical grinding wheel, is used with the line of grinding contact at an angle to the direction of the pivot axis. Here the thread profiles 92c', 92c, 92c" are concave and have the same tangents 91 as described. They coincide with the positions of the pivot axis. The relative curvature between the wheel and thread increases from left to right as in the described cases. The concave profile of the thread differs increasingly from the convex profile of the wheel. It becomes less curved from left to right. 93c', 93c, 93c" are the curvature centers at the points 44', 44, 44". The curvature radii 44'—93c', 44—93c, 44"—93c" increase from left to right.

When the thread sides are produced with a spherical grinding surface, they are envelopable by a sphere and have a constant circular arcuate profile in plane sections perpendicular to the relative path of the sphere center.

FIGURES 26 and 27 illustrate the case where the pivot axis is laid so as to coincide with the direction of the instantaneous line of grinding contact in the mean position, at the throat of the worm. This is illustrated for a convex grinding profile. However a straight profile could also be used.

The thread profile 104 is shown extended in dotted lines. 105 is the tangent thereto at mean point 44, and it is also the pivot axis. There is no relative curvature at the throat of the worm 110 between the grinding wheel and the thread surface, in a section along tangent 105, and little on both sides of the throat. This is expressed in diagram FIG. 16. 106 (FIG. 26) is the curvature center of both the grinding wheel profile and the thread profile 104 at mean point 44, in said section. The thread profiles 104', 104" adjacent opposite ends of the worm are curved nearly equally and slightly less than mean profile 104.

Here the pivot axis 105 (FIG. 27) is more inclined to the mid-plane 112 of the wormgear. It bypasses the axis 111 of the worm and intersects the mid-plane 112 of wormgear 113 between the axes of the worm and wormgear. The surface of revolution described by the pivot axis as it moves about the wormgear axis intersects the line of centers of the wormgear pair between the axes of the worm and wormgear. In FIG. 27 the line of centers coincides with line 112.

FIGS. 26 and 27 also illustrate the embodiment where the pivot axis coincides with the projection of the worm axial direction to the tangent plane at 44. It is then the intersection line of the tangent plane with a plane perpendicular thereto and parallel to the worm axis. In the view FIG. 27 the pivot axis then coincides with the projected surface normal at point 44. The surfaces of revolution described by the pivot axis and by said surface normal are tangent to each other and have the same taper. The wheel profile is convex while the thread profile is concave in a normal section laid along the pivot axis.

In the embodiments illustrated in FIGS. 21 to 27 the pivot axis lies in the tangent plane at mean point 44 to the thread side, and forms an acute angle with the direction of the worm axis.

Machine

An embodiment of a machine for carrying out the disclosed method will now be described with FIGURES 28 to 39.

FIG. 28 and FIG. 29 show the general disposition of such a machine. The horizontally arranged work spindle or work support 150 with workpiece 151 is carried on a slide 152 that is vertically adjustable on a pair of columns 153. These are at opposite ends of the work support. Adjustment is through a pair of screws 154 engaging nuts 155 and operable by turning a shaft 156. This shaft is geared to the screws 154 through pairs 157 of miter gears.

In the somewhat diagrammatic figures I have omitted the obvious and have confined disclosure chiefly to the novel arrangements. Screws or other means for fastening are generally not shown. Nor have I shown the conventional adjusting features other than the slides themselves, and the lubricating and safety features. It is obvious that these known parts and arrangements may all be used where desired.

The machine 160 is for simultaneous use of a pair of grinding wheels or rotary tools, that operate on opposite thread sides of workpiece 151. Each tool is carried by an interchangeable unit indicated in dotted lines 161 in FIG. 29. Two such units are described with FIGURES 30 to 34 and 35 to 39 respectively. Each of the horizontal turn tables 162, 162' carries one such unit. It is radially adjustable thereon along ways 163. Each turn table rests on a slide 164 and is mounted to turn about a cylindrical projection 165 secured to slide 164, with vertical axis 166. Axis 166 has approximately the same position with respect to the axis 170 of the workpiece as the axis of the mating wormgear has to that of the worm. The slides 164 are adjustable towards and away from the work support 150 along ways 167, 168 provided on the base or frame 171 of the machine.

In operation the work support 150 is turned on its axis 170 while the turn tables 162, 162' are turned on their vertical axes 166 in timed relation thereto and in direct proportion with each other. The turning ratio equals or approximately equals the inverse ratio of the tooth numbers of the worm and wormgear. This combined motion relatively moves the tool mounted on each unit 161 along a thread side of the workpiece. This is repeated for other tooth sides in the usual manner.

In one way of operation the work support is continuously and uniformly rotated on its axis 170, while the turn tables are oscillated on their axes 166. Working engagement is effected during oscillation in one direction, while during the return oscillation the tools are kept clear of the workpiece. They may be kept clear during the return by swinging them about axis 45 (FIGS. 7 to 9) or by radial displacement of the slides 164.

The worm blank turns through an integral number of pitches or threads per complete oscillation of the tables 162, 162'. On worms with multiple threads this number should be prime to the number of threads, so that different threads are engaged in successive oscillations, and all threads are ground in the same operation.

In FIG. 28 I have shown a known form of cam 172 for oscillating the turn tables 162, 162'. Cam 172 is uniformly rotated on a vertical axis 173 parallel to axis 166. It is mounted on the respective slide 164 and engages parallel plane sides 174 of a radial slot 175 provided on each turn table. The oscillations of the turn tables 162, 162' are not always exactly simultaneous, but may be somewhat staggered, depending on the location of the grinding or working contact.

In place of cams 172 a circular roller may be used if the cam carrier is rotated at a predetermined varying rate.

The change gears 176 are part of the timing train between the cam and the work support.

The unit 161' shown in FIGS. 30 to 34 serves for producing hourglass worms whose generating line intersects the line of centers at the pitch point, in the mid-position, as in the Cone and Hindley gearings. It is described first because it is more readily explained.

The grinding wheel 180, or rotary tool, is coaxial with a motor 181 that is rigid with a slide adjustable on a swing plate 182 in the direction of the wheel axis 183. If desired, speed change gears may be provided at the end of the motor opposite the grinding wheel, transmitting their motion through a hollow shaft of the motor. Swing plate 182 is adjustable or movable on a pivoted part 185 about a pin 184 with axis 45, as described with FIGURES 7 to 9. Part 185 is mounted to pivot about a horizontal pivot axis 186 that intersects the workpiece axis 170 at right angles. It intersects the thread side engaged by wheel 180 at the mean point of grinding contact 44.

While FIG. 30 shows the unit set to zero lead angle, FIG. 31 shows the set-up for a right hand worm.

A pin 187 or journal portion (FIG. 33) is rigidly secured to the pivoted part 185 that is mounted on a roller bearing 188 on the base part 190 of the unit. It is held against axial displacement by the flange 187' of said pin and by a shoulder 191, which both bear against said base part.

The pivoted part 185 has the general shape of a cradle and is further mounted on rollers 192 journalled on said base part. The base part is secured to one of the turn tables 162, 162' in the required position along their ways 163.

As known, the worm lead angle changes lengthwise of the thread side. When the generating line of the worm, or the mean point of said generating line, lies in the mid-plane of the wormgear, the lead angle or thread inclination is a maximum at the throat of the worm, at the pitch point, and decreases on both sides of the throat. The trigonometric tangent of the lead angle is inversely proportional to the worm radius. It equals the trigonometric tangent of the lead angle at the throat divided by $(r/r_0)$, where $r$ is the worm pitch radius at the considered point, and $r_0$ is the worm pitch radius at the throat.

It is customary to keep the proportion of throat radius $r_0$ to the center distance C constant, regardless of ratio. The proportion $(r/r_0)$ then depends only on the turning angle of the turn table from mid-position. In accordance with the invention the varying inclination of the pivoted part, the instantaneous lead angle position, is obtained with a vertically movable roller 200, FIGS. 31, 34, that engages a straight radial slot 201 provided on an upwardly projecting arm 202 of pivoted part 185. The path of the roller center is laterally offset from the pivot axis 186 (FIG. 31), so that the slot 201 and part 185 are tilted to the lead angle at the throat of the worm when in the mid-position the roller center is at 203. As the turn table turns on its axis away from mid-position and the workpiece turns on its own axis the roller is raised vertically. Near the end of the swing of the turn table the roller center is at 203'. The vertical motion of the roller is such that the vertical distance of the roller center over the level of the pivotal axis has the said proportion $(r/r_0)$ as compared with the vertical distance of the position 203 over said level.

This vertical displacement of the roller 200 is attained with a cam 205 (FIGS. 32, 34) that is turned about a vertical axis 196 parallel to the axis 166 of the turn table. It is turned in direct proportion to the turning angle of the turn table, and preferably through the same angles. Cam 205 is of barrel type, and acts on a pair of diametrically opposite tapered rollers 206 that are journalled on arms projecting upwardly from a vertical slide 207. Slide 207 carries roller 200. It is vertically movable on a horizontal adjustment slide 208 that is laterally adjustable on a horizontal U-shaped bar 209 secured to the base part 190 of the unit 161'. The horizontal adjustment used depends on the tooth ratio of the wormgear pair.

A shaft projection 210 is rigidly secured to cam 205. It is journalled at 211 on an arm of horizontal slide 208. It reaches into vertical slide 207 and is also journalled therein.

Cam 205 partakes in the oscillation of its turn table and is driven by a parallel linkage, as shown in FIG. 32. It turns in its bearings but does not turn in space. An upwardly projecting portion 212 is attached to slide 164 (FIG. 29) at a point offset laterally from axis 166. A link arm of adjustable length, 213, is pivotally attached at center 212' of portion 212. It is pivotally connected at 214 with an arm 215 rigidly secured to cam 205. The distance from the cam center 196 to center 214 is made equal to the distance of center 212' from axis 166. The described parallel linkage keeps the arm 215 and the cam in the same angular position in space. When the cam center is at 216 the link arm 213 is in a position 212'—214'. The cam arm position 216—214' is parallel to the original position. The cam turns however with respect to the tapered rollers 206 through the same angles as its turn table turns on slide 164.

The same cam 205 applies to all tooth ratios, provided that the proportion of $(r_0/C)$ is constant on the wormgear pairs. If a range of different proportions $(r_0/C)$ were desirable, this could be accomplished by providing a vertical adjustment of roller 200 on vertical slide 207.

The other unit 161' of the pair may be made identical with the described unit.

A slightly modified embodiment is attained when instead of a pivot axis 186 a pivot axis 186' (FIG. 30) is used, that coincides with the profile of an axial section of the worm.

A further unit will now be described with FIGURES 35 to 39. Unit 161 applies to the production of hourglass worms of the general type shown in FIGS. 1 to 5, where the mean point of the generating line is offset from the mid-plane of the wormgear and from the line of centers, which intersects the axes of the gear pair at right angles.

The shown pivot axis 300 is offset from the axis 170 of the work support and inclined at an acute angle thereto. It is also inclined to a horizontal plane. It passes through mean point 44 and preferably lies in the tangent plane to the thread side at said point. In dimensioning the unit it is practical to start out from an actual mean worm-drive design and then branch out from it.

The grinding wheel 301 has a working surface 302 whose profile is convex or straight. Wheel 301 is coaxial with a motor 181 rigid with a slide that is adjustable along wheel axis 183 on a swing plate 182. Swing plate 182 is adjustable or movable on a pivoted part 303 about a pin 184 with axis 45, whereby the wheel axis 183 describes a plane perpendicular to axis 45. Part 303 is pivoted to move about an oblique pivot axis 300 inclined to horizontal planes.

FIG. 35 shows the grinding wheel set up for grinding a right hand worm. A simpler view of the pivot part 303 is afforded by FIG. 36, which shows it turned about the pivot axis 300 through such an angle that the said plane described by the wheel axis is perpendicular to the drawing plane of FIG. 36. The pivoted part 303 is pivotally mounted on a base part 304 of the unit 161, by a bearing 305 and a plurality of rollers, one of which is shown at 306.

The position of the opposite unit 161 is diagrammatically shown in FIG. 35 when its mean point 44' is at the throat of the worm. 300' is the projected pivotal axis, while 166 denotes the axis of the turn table (162'). 183' is the grinding wheel axis which passes through center 45'.

The means for effecting the pivotal motion of part 303 will now be described. A slide 310 (FIGS. 37, 38) is laterally adjustable on a U-shaped beam 311 that is secured to projections 312 of base part 304. A part 313 with hollow vertical shaft 314 is mounted on said slide. It is rotatable and also axially movable thereon. At its lower end the part 313 contains a head 315 rigidly secured thereto with a toothed face coupling. A block 316 is radially adjustable on head 315 so that the center 331 of its ball joint 308 can be set to a predetermined distance from the rotational axis. Head 315 also mounts a conical roller 309 that engages a cam track 317 provided on a projection of slide 310. Another conical roller is mounted on an arm 318 of part 313. It engages another cam track 320 of slide 310. The two cam tracks 317, 320 hold the part in opposite directions and define the axial position thereof. The part 313 is turned on slide 310 through the same angles as the turn table 162 turns on its axis 166. It is turned through a linkage of which member 321 is a part. This member is coaxial with part 313, but mounted in an axially fixed position on a projection 322 of slide 310. A shaft 323 is rigidly secured to member 321 and provides the mounting journals therefor. It reaches into the hollow shaft 314 and is journalled therein. Member 321 drives part 313 with an axial projection 324 that engages a fork-like groove provided at the end of arm 318. Member 321 receives its motion through a parallel linkage whose lever 325 is pivotally mounted on a stationary pivot 326 projecting from slide 164. Pivot 326 is laterally offset from axis 166 and in line with it. Lever 325 is adjustable in length. It is pivotally connected at 327 with a bar 328 rigid with member 321.

FIG. 35 shows various positions of the linkage. 330 denotes the common axis of shafts 314, 323, in the central position. When the turn table 162 with unit 161 turns through an angle $u$ from the central position, axis 330 reaches position 330'; and link point 327 reaches position 327', while the pivot axis gets into position 300'. The described parallel linkage keeps line 330—327 in a parallel position 330'—327'. It also keeps line 330—331 in a parallel position 330'—331'. The ball center is then at 331'. In the position 330'' of axis 330 the ball center is at 331''.

The ball joint 308 is connected to the pivoted part 303 by a pair of links 335, 336 (FIGS. 36, 39). These constrain the ball center 331 to move in an axial plane of the pivoted part 303, in the drawing plane of FIG. 36. The drawing plane is a reference plane of the pivoted member. It defines the pivotal position of said member. Pivoted member 303 is so tilted about the pivot axis 300 during the grinding passes that the reference plane keeps following the ball center 331.

Point 307 (FIG. 37) is a point of the pivot axis 300. In the central position the ball center 331 is placed a chosen fixed distance A vertically above point 307. Its horizontal distance 307—308 from point 307 depends on the tooth ratio $(n/N)$ of the worm and wormgear and on the proportion $(C/r'_0)$ of the center distance C to the ordinate $r'_0$ of the mean point in the mid-plane of the worm 40 (FIG. 2), from the level of the worm axis (35'). Distance 307—308 should be set to $$A \cdot (n/N) \cdot [(C/r'_0) - 1]$$

where the last factor is a constant. The distance 330—331 (FIG. 35) depends on the angle $e$ (FIG. 3), through which the mean point (40) is turned away about the worm axis from the line of centers. It equals $A \cdot \tan e$.

The cam tracks 317, 320 provide a vertical displacement proportional to the ordinates of points 40, 40' (FIG. 2) from the level of the worm axis. At any turning angle $u$ of the turn table 162 away from the central position it corresponds to the ordinate of a point 40' (FIG. 2) that is turned away from the central position through the same angle $u=40—47'—40'$.

The described mechanical construction of the tilt about the pivot axis is exact. It is broadly applicable on worm drives where the radius of circle 41 (FIG. 2) has a given constant proportion to the center distance of the worm drive.

If so desired it could be made applicable also to other proportions by mounting part 313 and member 321 on a vertically adjustable slide on top of slide 310, and by using ball joints at the points 326, 327.

*Mathematical Proof*

The pivot axis 300 lies in the common tangent plane at mean point 44 of the thread side and the grinding surface. This plane is a reference plane of the pivoted part 303. Part 303 should be so tilted in different turning positions of the turn table that the reference plane remains a tangent plane at the point reached by mean point 44. It should be so tilted about the pivot axis 300 that the reference plane contains the direction of relative motion at said point.

In FIGS. 1 to 3 numeral 40 denotes the mean point. We start out to determine the direction of relative motion at any point 40' of the circle 41 (FIG. 2) described by mean point 40. This direction is also the direction of the pitch-line tangent.

In the central position 40, point 40 of the worm 35 has a velocity or displacement defined by distance 40—40a. It is shown in full in FIG. 3 and in projection in FIGS. 1 and 2. Point 40 of the generating line 36 has a velocity or simultaneous displacement 40c—40a, so that the dotted line 40—40c is the sought direction of relative motion. 40'—40a' defines the velocity of worm point 40', while 40c'—40a' defines the velocity of point 40' of the generating line 36. The resultant 40'—40c' is the sought direction. It is the pitch-line tangent at point 40'.

The velocity 40'—40a' can be resolved into a horizontal component proportional to the elevation or ordinate ($r'$) of point 40' over the level of the worm axis 35' (FIG. 2), and into a vertical component proportional to the offset of point 40' from the mid-plane 39 of the wormgear. This offset is constant and equal to the distance of the plane of circle 41 from said mid-plane.

The sought tangent plane at 40' contains the pivot axis, and is the plane connecting this axis with point 40c'.

The drawing plane of FIG. 36 contains the pivot axis 300 and also the pitch-line tangent at the mean point (44 or 40 resp.). It is the thread tangent plane at said mean point and the reference plane. The plane to be described by the axis (183) of the grinding wheel, as it is adjusted about pin 184, is perpendicular to the pitch line tangent and to the reference plane.

When the mean point is at 40' the reference plane contains line 40'—40c'. The invention constructs line 40'—40c' mechanically and keeps end point 40c' in the reference plane by constraining said end point to move in a plane containing the axis 300 of the pivoted member, in a plane coinciding with the reference plane.

Instead of starting line 40'—40c' and line 40—40c from the mean point of contact itself, it can be conveniently started from any suitable point of the pivotal axis 300, such as from point 307 (FIGS. 35, 37). The horizontal distance 307—308 corresponds to the distance 40c—40a. Its length is constant in all turning positions, and it moves with the base part 304. Its length is proportional to the tooth ratio ($n/N$). The vertical distance 308—331 (FIG. 37) corresponds to the horizontal component of distance 40—40a (FIG. 3), while the horizontal distance 330—331 (FIG. 35) corresponds to the vertical component of distance 40—40a. It is constant and proportional to the offset of circle 41 from the mid-plane of the wormgear represented by the turn table (162). It does not change direction in different turning positions.

Distance $A = 308$—$331$ is made of suitable fixed length. Distance 307—308 is then $A \cdot \tan e$, as described. The plane that contains the pivot axis 300 and point 331 defines the angular position of the reference plane when grinding contact is at 44.

As the turn table turns away from mid-position through any angle $u$ (FIG. 35) point 331 moves to 331'. Its vertical distance from point 307 of the pivot axis is increased in proportion to the increase of the horizontal component of 40'—40a' (FIG. 3). When the ordinate of point 40 (FIG. 2) from the level of the worm axis 35' is denoted $r'_0$ and the ordinate of point 40' is denoted $r'$, then the vertical distance of point 331' from the level of point 307 is $A \cdot (r'/r'_0)$. At a given proportion of $r'_0$ to the center distance C of the wormgear pair this distance of point 331' depends only on the turning angle $u$. A single pair of cams can be provided, as described.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

I claim:

1. The method of producing an hourglass worm and an hourglass hob for cutting a wormgear which is to mate with said worm, which comprises producing the hourglass worm by rotatably mounting a workpiece of hourglass shape and a rotary tool for engagement with each other, said rotary tool having an outside diameter larger than the maximum outside diameter of the worm being produced, rotating said tool on its axis, effecting turning motion between said tool and workpiece about the axis of the workpiece and in time therewith a turning motion about an axis offset from and angularly disposed to the axis of the workpiece, said offset axis having its smallest distance from the axis of the workpiece at the throat thereof, to relatively move the rotating tool along a thread side of the workpiece whereby to form said thread side by envelopment, and simultaneously moving said tool angularly about a pivot axis passing adjacent the engagement between said tool and workpiece, said angular motion being at a varying ratio to the turning motion about the axis of the workpiece, whereby to keep the rotating tool aligned with the lengthwise direction of the engaged thread side of the workpiece, and producing the hob for the mating wormgear with a pair of rotary tools of unequal normal radii, the tool, which acts on the side of the relieved hob teeth, which has the larger lead angle, having a smaller mean normal radius than the tool acting on the opposite side, the normal radii of said pair of tools approximately averaging the mean normal radius of the tool used in producing the worm.

2. The method of producing hourglass worms and hourglass hobs, which comprises rotatably mounting a workpiece of hourglass shape and a rotary tool for engagement with each other, rotating said tool on its axis, turning said workpiece on its own axis while in timed relation therewith effecting a further turning motion between said tool and workpiece about an axis offset from and angularly disposed to the workpiece axis, to relatively move the rotating tool along a thread side of the workpiece, whereby to form said thread side by envelopment, and simultaneously moving said tool angularly about a pivot axis that is aligned with the thread side being produced and that bypasses said offset axis, to keep the tool aligned with the lengthwise direction of said thread side.

3. The method according to claim 2, wherein said pivot axis lies in a tangent plane of the thread side that is engaged by said tool.

4. The method according to claim 3, wherein said pivot axis extends in the direction of the line of contact between said thread side and the surface of revolution of the rotating tool, adjacent the throat of the worm.

5. The method according to claim 3, wherein said pivot axis is the intersection of said tangent plane with a plane parallel to the workpiece axis and perpendicular to said tangent plane, adjacent the throat of the worm.

6. The method according to claim 2, wherein said pivot axis is offset from the axis of the workpiece.

7. The method according to claim 2, wherein said pivot axis is inclined to the depthwise direction of the thread space engaged by the tool.

8. The method according to claim 2, wherein the midposition said pivot axis forms an acute angle with the direction of the workpiece axis.

9. The method of grinding hourglass worms and hourglass hobs, which comprises rotatably mounting a workpiece of hourglass shape and a grinding wheel adjacent each other, rotating said grinding wheel on its axis, turning said workpiece on its own axis while in timed relation therewith effecting a further turning motion between said grinding wheel and workpiece about an axis offset from and angularly disposed to the workpiece axis, to relatively move the grinding wheel along a threadside of the workpiece in grinding contact with said thread side, and simultaneously moving said grinding wheel about a pivot axis passing through a mean point of said grinding contact and bypassing said offset axis, to keep the grinding wheel aligned with the lengthwise direction of said thread side.

10. The method of grinding hourglass worms and hourglass hobs of concave thread profile in axial planes, which comprises rotating a grinding wheel, which has a grinding surface of convex axial profile that has a mean radius of curvature smaller than twice its mean normal radius, in engagement with a workpiece of hourglass shape while effecting turning motion between said grinding wheel and workpiece about the axis of rotation of the workpiece and in time therewith a turning motion about an axis of rotation offset from and angularly disposed to the axis of rotation of the workpiece, to relatively move said grinding wheel along a thread side of the workpiece, and simultaneously moving the grinding wheel about a pivot axis at a varying rate, to keep it aligned with the lengthwise direction of the engaged thread side.

11. The method according to claim 10, wherein the grinding wheel has a grinding surface that lies in a spherical surface centered on its axis.

12. The method of grinding hourglass worms and hourglass hobs, which comprises rotating a grinding wheel whose opposite side surfaces have unequal profile inclinations to its radial direction in engagement with a workpiece of hourglass shape, with the side surface of larger profile inclination of the wheel in engagement with the workpiece, while effecting feed motion between said grinding wheel and workpiece to relatively move said grinding wheel along a thread side of the workpiece in grinding contact therewith, repeating said motions and from time to time dressing the grinding wheel after advancing it by moving it angularly about a point of its axis of rotation and also moving it in the direction of its axis of rotation, so that the wheel axis keeps passing through said point while the diameter of the grinding wheel decreases.

13. The method of producing an hourglass worm, and an hourglass hob for cutting a wormgear which is to mate with said worm, which comprises producing the hourglass worm by rotating a tool in engagement with a workpiece of hourglass shape while rotating said workpiece in timed relation with the tool, and while effecting a relative movement between the tool and workpiece about an axis offset from and angularly disposed to the axis of the workpiece in timed relation to the rotation of the workpiece, and while effecting further relative pivotal movement between the tool and workpiece in time with the last-named relative movement and at a varying ratio thereto, the outside portions of said rotating tool describing a circle of larger diameter than the maximum outside diameter of the worm being produced, and producing the hob for the mating wormgear with a rotating tool whose outside portions also describe a circle of larger diameter than said maximum outside diameter.

References Cited in the file of this patent

UNITED STATES PATENTS

| | | |
|---|---|---|
| 1,767,796 | Hughes | June 24, 1930 |
| 2,018,847 | Fraser | Oct. 29, 1935 |
| 2,164,491 | Bitler | July 4, 1939 |
| 2,280,783 | Bell et al. | Apr. 28, 1942 |
| 2,432,246 | Mackmann et al. | Dec. 9, 1947 |
| 2,607,175 | Osplack | Aug. 19, 1952 |
| 2,613,486 | Praeg | Oct. 14, 1952 |
| 2,669,128 | Steiner | Feb. 16, 1954 |
| 2,810,189 | See | Oct. 22, 1957 |
| 2,812,668 | Holt | Nov. 12, 1957 |
| 2,858,599 | Broom | Nov. 4, 1958 |
| 2,978,843 | Birtch et al. | Apr. 11, 1961 |